Patented Dec. 31, 1940

2,227,060

UNITED STATES PATENT OFFICE 2,227,060

TERPENE-CYANOACYL COMPOUND AND METHOD OF PRODUCING SAME

Joseph N. Borglin, Wilmington, Del., assignor to Hercules Powder Company, Wilmington, Del., a corporation of Delaware No Drawing. Application December 27, 1939, Serial No. 311,172

12 Claims. (Cl. 260—454)

This invention relates to terpene thiocyanoacyl esters in which the acyl group is derived from a naphthenic acid and to the corresponding selenocyanoacyl and tellurocyanoacyl esters. It also relates to a method for the preparation of such esters.

By the method in accordance with this invention, I react a terpene which contains one or more double bonds or which contains one or more hydroxyl groups within its structure with a halogenated naphthenic acid and then with a metal thiocyanate, a metal selenocyanate, or a metal tellurocyanate which is reactive under the conditions employed. There is obtained a compound of the type formula ROOCR'XCN in which R is a radical of a terpene compound, in which the group OOCR' is a radical of a naphthenic acid, and in which X is sulphur, selenium, or tellurium.

The terpene which I employ may be an unsaturated terpene hydrocarbon such as, for example, pinene, terpinene, terpinolene, camphene, fenchene, dipentene, menthene, sylvestrene, phellandrene, etc. Again it may be a saturated or unsaturated terpene alcohol. It may be a terpene secondary alcohol such as, for example, borneol, isoborneol, fenchyl alcohol, etc.; a terpene tertiary alcohol such as terpineol, hydroterpineol, etc.; a terpene polyhydric alcohol such as terpin, sobrerol, etc.; a condensate of formaldehyde and an unsaturated terpene compound, etc., or it may be a terpene ether such as, for example, terpinyl methyl ether, terpinyl ethyl ether, terpinyl butyl ether, ethylene glycol ether of pinene, diethylene glycol ether of pinene, glycerol ether of pinene. Commercial terpene cuts such as gum or wood turpentine, pine oil, etc., are suitable.

The halogen substituted naphthenic acid which I utilize may, for example, be derived by the halogenation of a naphthenic acid or mixture of naphthenic acids obtained from mid-continent, Russian, or other petroleum, or from cracked petroleum compounds. However, naphthenic acids from any source may be utilized; such acids as, for example, cyclopropane carboxylic acid, cyclobutane carboxylic acid, cyclobutane dicarboxylic acid, cyclopentane carboxylic acid, cyclopentane dicarboxylic acid, 2-methylcyclopentane carboxylic acid, and 3,3,4-trimethylcyclopentyl acetic acid, etc., may be utilized. The term "naphthenic acid" includes in general the acids having an alicyclic structure. The naphthenic acids may be halogenated in any of the usual manners, i. e. by chlorination, bromination, iodination or fluorination in the liquid or vapor phase, or in an inert solvent such as carbon tetrachloride, or by hydrohalogenation, etc. In general, halogenated mixed naphthenic acids derived from petroleum are most suitable because of their low cost. They may be diluted by hydrocarbons or other solvents.

The metal thiocyanate which I may use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, calcium thiocyanate, ammonium thiocyanate, etc. When it is desired to make a selenocyanoacylate, the metal selenocyanate I may use, may be, for example, sodium selenocyanate, potassium selenocyanate, lithium selenocyanate, ammonium selenocyanate, calcium selenocyanate, etc.; and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The terpene compound will first be reacted with a halogenated naphthenic acid and the resulting ester of the terpene isolated from by-products of the reaction. Preferably, acidic materials are removed. The second stage of the reaction is the treatment of this halogen acid ester with the metal thiocyanate, selenocyanate, or tellurocyanate as the case may be. I may carry out each of these steps in the presence of a suitable inert solvent and in fact I prefer to use an inert solvent such as, for example, methanol, ethanol, propanol, isopropanol, butanol, acetone, ethyl acetate, etc., in the second stage. Each step of my process may be carried out at any temperature within the range of about 0° C. to about 250° C., and preferably within the range of about 50° C. to about 180° C.

The halogen substituted acylates of the first stage reaction are light in color if the reaction is carried out in the absence of oxygen, for example, under a blanket of $CO_2$. Substantially water-white esters may be obtained by vacuum distillation. The color of the thiocyanoacylate products follows the color of the first stage ester from which they are prepared. Where very light-colored products are desired and where it is desired to insure products of no odor or minimum odor, the first stage reaction may be conducted, if desired, in a non-oxidizing atmosphere, or the first stage product may be vacuum distilled, or both these measures may be taken.

The method in accordance with this invention will be further illustrated by the examples which follow. All parts and percentages will be by weight unless otherwise specified.

*Example 1*

In this example bromonaphthenic acids prepared by bromination of a commercial naphthenic acid mixture having an acid number of 262 (Harshaw Chemical Company "Low Acid Number" Naphthenic Acid) were utilized. A mixture of 30 parts of this bromonaphthenic acid and 30.8 parts of alpha-terpineol was heated for approximately 48 hours in an oil bath at 160–170° C. while protected by a blanket of carbon dioxide. The reaction product mixture was then subjected to distillation at reduced pressure to remove unreacted terpineol. The residue containing the bromonaphthenic esters had a bromine content of 13%.

27.9 parts of this first stage product were mixed with 80 parts of 95% ethyl alcohol and 25 parts of sodium thiocyanate and the mixture refluxed for one hour. About 100 parts of commercial heptane were then added and the resulting solution was washed repeatedly with water. Volatile solvents were removed by evaporation at reduced pressure. A yield of 32.8 parts of product containing the esters, chiefly terpinyl, of the thiocyanonaphthenic acids, and having a sulfur content of 2%, was obtained.

*Example 2*

A mixture of 27.2 parts of camphene and 30 parts of the bromonaphthenic acids, the same as those used in Example 1, was heated under a blanket of carbon dioxide for 48 hours in an oil bath at 160–170° C. The reaction mixture was then subjected to steam distillation to remove unreacted camphene. The residue was freed from water by azeotropic distillation with toluene, excess toluene being removed by evaporation at reduced pressure. The residue thus obtained had a bromine content of 18.5% and consisted chiefly of isobornyl bromonaphthenic esters.

22.2 parts of the first stage product were mixed with 20 parts of sodium thiocyanate and 60 parts of 95% ethyl alcohol and the mixture was refluxed for one hour. 20 parts of benzene and 60 parts of commercial heptane were then added and the resulting solution was washed repeatedly with water. Emulsions formed in the washing operations were broken by the addition of 20–40 parts of ethyl alcohol. Finally volatile solvents were removed by evaporation at reduced pressure. The resulting product, analyzing 2.4% sulfur, represented the isobornyl thiocyanonaphthenic acid esters derived from the camphene.

*Example 3*

A mixture of 27.2 parts of alpha-pinene and 30 parts of bromonaphthenic acids similar to those used in Example 1 was heated under a blanket of carbon dioxide for about 48 hours in an oil bath at a temperature of 160–170° C. The reaction product was distilled at reduced pressure to remove excess pinene. 35.9 parts of distillation residue containing terpene bromonaphthenic acid esters and analyzing 15.0% bromine were obtained.

33.9 parts of this first stage product were mixed with 25 parts of sodium thiocyanate and 80 parts of 95% ethyl alcohol and the mixture was refluxed for one hour. 100 parts of commercial heptane were then added and the resulting solution washed with water. Volatile solvents were then removed by evaporation at reduced pressure. A yield of 31 parts of product containing the thiocyanonaphthenic acid esters derived from the pinene was obtained.

*Example 4*

A mixture of 30.8 parts of fenchyl alcohol and 30 parts of bromonaphthenic acid similar to that used in Example 1 was heated under a blanket of carbon dioxide for about 50 hours in an oil bath at about 160–170° C. The reaction product was then treated as in Example 2. The first stage residue containing the bromonaphthenic esters of fenchyl alcohol had a bromine content of 15.8%.

24.5 parts of the first stage product were mixed with 20 parts of sodium thiocyanate and 60 parts of 95% ethyl alcohol and the mixture was refluxed for one hour. 100 parts of commercial heptane were then added and the resulting solution was washed several times with water. Emulsions formed were broken by the addition of ethyl alcohol. Volatile solvents were removed by evaporation at reduced pressure. The product containing the fenchyl thiocyanonaphthenic esters had a sulfur content of 2.2%.

*Example 5*

In this example bromonaphthenic acids prepared by the bromination of a commercial naphthenic acid mixture having a distillation range of 160–198° C. at 6 mm. pressure and the acid number of 272 were used. 28 parts of this bromonaphthenic acid and 30.8 parts of borneol were heated together under a blanket of carbon dioxide for 24 hours in an oil bath at 140–150° C. and then for 36 hours at about 160° C. The resulting reaction product mixture was treated as in Example 2. The residue containing chiefly bornyl bromonaphthenic esters had a bromine content of 13.5%.

22.7 parts of the first stage product were mixed with 60 parts of 95% ethyl alcohol and 20 parts of sodium thiocyanate and the mixture was refluxed for one hour. 70 parts of commercial heptane were added and the resulting mixture was washed with water. Volatile solvents were removed by evaporation at reduced pressure. A yield of 31.1 parts of product, containing the bornyl thiocyanonaphthenic acid esters, and analyzing 2.2% sulfur, was obtained.

*Example 6*

A mixture of 27.2 parts of camphene and 28 parts of bromonaphthenic acids similar to that used in Example 5 was heated under a blanket of carbon dioxide for 24 hours in an oil bath at 148–150° C. and then for 32 hours at about 160° C. The reaction product was treated as in Example 2. The residue, containing chiefly isobornyl bromonaphthenates derived from the camphene, had a bromine content of 13.8%.

19.4 parts of the first stage product was mixed with 15 parts of 95% ethyl alcohol and the mixture was refluxed for one hour. 40 parts of benzene and 70 parts of commercial heptane were added and the resulting solution was repeatedly washed with water. Finally volatile solvents were removed by evaporation at reduced pressure. The product containing the isobornyl thiocyanonaphthenic acid esters had a sulfur content of 2.1%.

The products of the examples contain unesterified terpene compounds and petroleum hydrocarbons in varying proportion. A certain portion of the original reactant is usually not esterified and, in addition, there may be some conversion of esters to terpene hydrocarbons in the second stage. The unesterified terpene compounds and petroleum hydrocarbons may be removed by vacuum distillation or vacuum steam distillation if desired. However, such removal is in general of no advantage since the products of this invention are conveniently utilized in diluted form for most purposes and since the diluents mentioned are in most cases colorless and of pleasant or slight odor. Similarly, complete removal of petroleum ether or other inert solvent from the product is usually unnecessary. However, I prefer to remove excess metal thiocyanate, selenocyanate, or tellurocyanate, and any other water soluble material from the product, for example, by thorough washing of a petroleum ether solution with water.

The compounds according to this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. The compounds are also useful as flotation agents in the concentration of minerals. They may also be used as intermediates for the preparation of other compounds, such as, for example, wetting agents by treatment with an oxidation agent such as nitric acids. Many of the compounds possess wetting power without modification. It will be noted emulsions with water were formed in some of the examples.

Where the term "pinene" is used herein, it will be understood to refer to the alpha and beta forms. Similarly "terpineol" and "hydroterpineol" include the alpha, beta, and gamma forms.

This application is a continuation-in-part of my previous application, Serial No. 198,687, filed March 29, 1938, entitled "Terpene-cyanoacyl compounds and methods of producing same" now Patent No. 2,217,611.

It will be understood that the details and examples hereinbefore set forth are illustrative only, and that the invention as broadly described and claimed is in no way limited thereby.

What I claim and desire to protect by Letters Patent is:

1. A terpene compound having the type formula ROOCR'XCN in which R is a radical of a terpene compound, in which the group OOCR' is a naphthenic acid radical, in which X is a member of the group consisting of sulfur, selenium, and tellurium and in which the —OOCR'XCN group is attached to a tepene carbon atom of radical R.

2. A terpene compound having the type formula ROOCR'SCN in which R is a radical of a terpene compound in which the group OOCR' is a naphthenic acid radical and in which the —OOCR'SCN group is attached to a terpene carbon atom of radical R.

3. A terpene compound having the type formula ROOCR'XCN in which R is a radical of a terpene secondary alcohol, in which the group OOCR' is a naphthenic acid radical in which X is a member of the group consisting of sulfur, selenium, and tellurium and in which the —OOCR'XCN group is attached to a terpene carbon atom of radical R.

4. A bornyl thiocyanonaphthenate.

5. An isobornyl thiocyanonaphthenate.

6. A fenchyl thiocyanonaphthenate.

7. A method for the production of the terpene compound described in claim 1 which comprises reacting a terpene compound selected from the group consisting of unsaturated terpene compounds and saturated terpene alcohols with a halogenated naphthenic acid and then with a compound selected from the group consisting of metal thiocyanates, metal selenocyanates, and metal tellurocyanates which are at least partially soluble in the reaction mixture.

8. A method for the production of the terpene compound described in claim 1 which comprises reacting a terpene compound selected from the group consisting of unsaturated terpene compounds and saturated terpene alcohols with a chlorinated naphthenic acid and then with a metal thiocyanate at least partially soluble in the reaction mixture.

9. A method for the production of the terpene compound described in claim 1 which comprises reacting a terpene compound selected from the group consisting of unsaturated terpene compounds and saturated terpene alcohols with a brominated naphthenic acid and then with a metal thiocyanate at least partially soluble in the reaction mixture.

10. A method for the production of the terpene compound described in claim 1 which comprises reacting an unsaturated terpene hydrocarbon with a halogenated naphthenic acid derived from petroleum and then with an alkali metal thiocyanate.

11. A method for the production of the terpene compound described in claim 1 which comprises reacting an unsaturated terpene alcohol with a halogenated naphthenic acid derived from petroleum and then with an alkali metal thiocyanate.

12. A method for the production of the terpene compound described in claim 1 which comprises reacting a terpene secondary alcohol with a brominated naphthenic acid derived from petroleum and then with an alkali metal thiocyanate.

JOSEPH N. BORGLIN.